US009100952B2

(12) United States Patent
Miki

(10) Patent No.: US 9,100,952 B2
(45) Date of Patent: Aug. 4, 2015

(54) BASE STATION APPARATUS, MOBILE STATION APPARATUS AND CONTROL INFORMATION TRANSMISSION METHOD

(75) Inventor: Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 632 days.

(21) Appl. No.: 13/518,917

(22) PCT Filed: Dec. 6, 2010

(86) PCT No.: PCT/JP2010/071840
§ 371 (c)(1),
(2), (4) Date: Aug. 22, 2012

(87) PCT Pub. No.: WO2011/083651
PCT Pub. Date: Jul. 14, 2011

(65) Prior Publication Data
US 2012/0307759 A1    Dec. 6, 2012

(30) Foreign Application Priority Data
Jan. 11, 2010    (JP) ................. 2010-003495

(51) Int. Cl.
*H04W 72/04*    (2009.01)
*H04L 5/00*    (2006.01)
*H04W 28/04*    (2009.01)
*H04W 88/08*    (2009.01)

(52) U.S. Cl.
CPC ........... *H04W 72/042* (2013.01); *H04L 5/0037* (2013.01); *H04L 5/0096* (2013.01); *H04L 5/001* (2013.01); *H04L 5/0023* (2013.01); *H04W 28/04* (2013.01); *H04W 88/08* (2013.01)

(58) Field of Classification Search
CPC ... H04L 5/0023; H04L 5/0037; H04L 5/0096; H04W 72/1289; H04W 88/08
See application file for complete search history.

(56) References Cited

U.S. PATENT DOCUMENTS 8,374,650 B2 * 2/2013 Kotecha et al. ............... 455/561
2009/0274077 A1 * 11/2009 Meylan et al. ................ 370/280
2012/0140712 A1 * 6/2012 Yamada et al. ............... 370/329

OTHER PUBLICATIONS

International Search Report wt/ranslation from PCT/JP2010/071840 dated Jan. 11, 2011 (3 pages).
3GPP TR 25.912 V7.1.0; "3rd Generation Partnership Project; Technical Specification Group Radio Access Network; Feasibility study for evolved Universal Terrrestrial Radio Access (UTRA) and Universal Terrestrial Radio Access Network (UTRAN) (Release 7)"; Sep. 2006 (57 pages).

* cited by examiner

*Primary Examiner* — Raj Jain
(74) *Attorney, Agent, or Firm* — Osha Liang LLP

(57) ABSTRACT

The present invention is directed to preventing occurrence of PDCCH blocking while reducing PDCCH detection errors. The present invention provides a search space size adaptive control section (203) that controls the size of the UE-specific search space adaptively depending on the number of component carriers to which a PDSCH for a mobile station apparatus (10) is assigned, a control information generation section (201) that generates control information reflecting a control result by the search space size adaptive control section (203), and a transmission/reception section (23) that transmits this control information to a mobile station apparatus (10) by RRC signaling.

18 Claims, 11 Drawing Sheets (A)

(B)

| IDENTIFICATION INFORMATION | | | ASSIGNMENT INFORMATION |
|---|---|---|---|
| ID#1 | PDCCH#1 | PDSCH#1 | ON |
| ID#2 | PDCCH#2 | PDSCH#2 | ON |
| ID#3 | PDCCH#3 | PDSCH#3 | ON |
| ID#4 | PDCCH#4 | PDSCH#4 | ON |
| ID#5 | PDCCH#5 | PDSCH#5 | ON |

FIG. 6

BASE STATION APPARATUS, MOBILE STATION APPARATUS AND CONTROL INFORMATION TRANSMISSION METHOD

TECHNICAL FIELD

The present invention relates to a base station apparatus, a mobile station apparatus and a control information transmission method. More particularly, the present invention relates to a base station apparatus, a mobile station apparatus and a control information transmission method in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, Non-Patent Literature 1).

In a third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). For example, regarding LTE-A, there is a plan to expand the 20-MHz maximum system band of LTE specification to approximately 100 MHz.

In a system of the LTE scheme (LTE system), downlink control information is transmitted from a base station apparatus to mobile station apparatuses on PDCCHs (Physical Downlink Control Channels). PDCCHs include a PDCCH (UE-common PDCCH) which all mobile station apparatuses need to receive at the same time, and PDCCHs (UE-specific PDCCHs) which mobile station apparatuses have to receive individually. In order to detect these PDCCHs while reducing load in mobile station apparatuses, the LTE system defines a UE-common search space, which is placed in a common position between all mobile station apparatuses and which includes the above UE-common PDCCH, and a UE-specific search space, which is placed in a separate position for each mobile station apparatus and which includes the above UE-specific PDCCHs. Amongst the CCEs (Control Channel Elements), which are the fundamental units to which PDCCHs are assigned, the UE-common search space is placed in CCEs placed in the top part. On the other hand, the UE-specific PDCCH is placed randomly based on mobile station apparatus identification information (UE-ID) and subframe numbers.

CITATION LIST

Non-Patent Literature

Non-Patent Literature 1: 3GPP, TR25.912 (V7.1.0), "Feasibility study for Evolved UTRA and UTRAN," September 2006

SUMMARY OF INVENTION

Technical Problem

However, in the LTE system, since the UE-specific search space is defined as described above in order to reduce the load of mobile station apparatuses, when assigning PDCCHs to a plurality of mobile station apparatuses, cases might occur where, even though there are available PDCCH radio resources, PDCCH radio resources in the UE-specific search space are already allocated to other mobile station apparatuses and therefore cannot be allocated (hereinafter this situation will be referred to as "PDCCH blocking").

Meanwhile, to prevent such PDCCH blocking from occurring, expanding the UE-specific search space may be possible. However, as described above, the load of mobile station apparatuses increases, and, in addition, a mobile station apparatus acquires PDCCHs assigned to that mobile station apparatus by performing blind detection of the CRC (Cyclic Redundancy Check) code which is attached to the PDCCHs and which is masked by the UE-ID of that mobile station apparatus, using the UE-ID. In this blind detection, the characteristics of CRC cause assignment to the mobile station to detect by error, at a probability of $1/2^N$ (where "N" is the number of CRC bits) in one blind detection. Consequently, there is a problem that, in the event the UE-specific search space is expanded M-fold, the probability of detection errors also increases M-fold. That is to say, there is a tradeoff relationship between PDCCH blocking and the probability of PDCCH detection errors.

In a system of the LTE-A scheme (LTE-A system), there is a plan to widen the system band by combining a plurality of fundamental frequency blocks (component carriers), each of which is the system band of the LTE system (carrier aggregation). Also, in the LTE-A system, there is a plan to assign a PDCCH that is necessary to receive a PDSCH (Physical Downlink Shared Channel) to which downlink transmission data is assigned, to different component carriers from the component carriers to which that PDSCH is assigned. In this way, in the event a PDCCH corresponding to a PDSCH is assigned to a different component carrier from the component carrier to which that PDSCH is assigned, if the same UE-specific search space as in the LTE system is defined, a problem arises that the number of PDCCHs to correspond to a certain mobile station apparatus increases and the possibility of occurrence the above-described PDCCH blocking increases.

The present invention has been made taking into account the above points, and it is therefore an object of the present invention to provide a base station apparatus, mobile station apparatus and control information transmission method that can reduce the PDCCH detection errors and reduce the occurrence of PDCCH blocking.

Solution to the Problem

A base station apparatus according to the present invention has: a control section configured to adaptively control a size of a UE-specific search space depending on the number of component carriers to which a PDSCH for a mobile station apparatus is assigned; a control information generation section configured to generate control information reflecting a control result by the control section; and a transmission section configured to transmit the control information to the mobile station apparatus by RRC signaling.

According to this configuration, the size of the UE-specific search space is controlled adaptively depending on the number of component carriers to which the PDSCH for the mobile station apparatus is assigned, so that it is possible to enlarge or reduce the UE-specific search space in accordance with the number of component carriers to which the PDSCH is assigned. By this means, in the event the UE-specific search space is enlarged, it becomes easier to avoid the situation where UE-specific PDCCHs are blocked, and therefore reduce the occurrence of PDCCH blocking. On the other hand, in the event the UE specific search size is reduced, it is possible to reduce the number of times to perform the blind detection process which increases in accordance with the search space size, and therefore reduce PDCCH detection errors in the mobile station apparatus.

A mobile station apparatus according to the present invention has: a receiving section configured to receive, from a base station apparatus, by RRC signaling, control information which reflects a size of a UE-specific search space controlled adaptively depending on the number of component carriers to which a PDSCH for the mobile station apparatus is assigned; and a detection section configured to execute a blind detection process of the UE-specific search space designated by the control information.

According to this configuration, the blind detection process can be performed using a UE-specific search space that is controlled adaptively depending on the number of component carriers to which the PDSCH for the mobile station apparatus is assigned, so that it is possible to perform blind detection of a PDCCH, which is control information for the PDSCH for the mobile station apparatus, in a necessary range only.

A control information transmission method according to the present invention comprises the steps of: at a base station apparatus: adaptively controlling a size of a UE-specific search space depending on the number of component carriers to which a PDSCH for a mobile station apparatus is assigned; generating control information reflecting a controlled result; and transmitting the control information to the mobile station apparatus by RRC signaling; and at the mobile station apparatus: receiving the control signal; and executing a blind detection process of the UE-specific search space designated by the control information.

According to this method, the size of the UE-specific search space is controlled adaptively depending on the number of component carriers to which the PDSCH for the mobile station apparatus is assigned, so that it is possible to enlarge or reduce the UE-specific search space in accordance with the number of component carriers to which the PDSCH is assigned. By this means, in the event the UE-specific search space is enlarged, it becomes easier to avoid the situation where UE-specific PDCCHs are blocked, and therefore reduce the occurrence of PDCCH blocking. On the other hand, in the event the UE specific search size is reduced, it is possible to reduce the number of times to perform the blind detection process which increases in accordance with the search space size, and therefore reduce PDCCH detection errors in the mobile station apparatus.

Technical Advantages of the Invention

According to the present invention, the size of the UE-specific search space is controlled adaptively depending on the number of component carriers to which a PDSCH for a mobile station apparatus is assigned, so that it is possible to enlarge or reduce the UE-specific search space according to the number of PDCCHs. By this means, in the event the UE-specific search space is enlarged, it becomes easier to avoid the situation where PDCCHs are blocked, and therefore reduce the occurrence of PDCCH blocking. On the other hand, in the event the UE specific search size is reduced, it is possible to reduce the number of times to perform the blind detection process which increases in accordance with the search space size, and therefore reduce PDCCH detection errors in a mobile station apparatus.

BRIEF DESCRIPTION OF DRAWINGS

FIG. 6 is a diagram showing an example of switching setting information that is reported from a base station apparatus to a mobile station apparatus according to the present invention;

DESCRIPTION OF EMBODIMENTS

Figure 1:
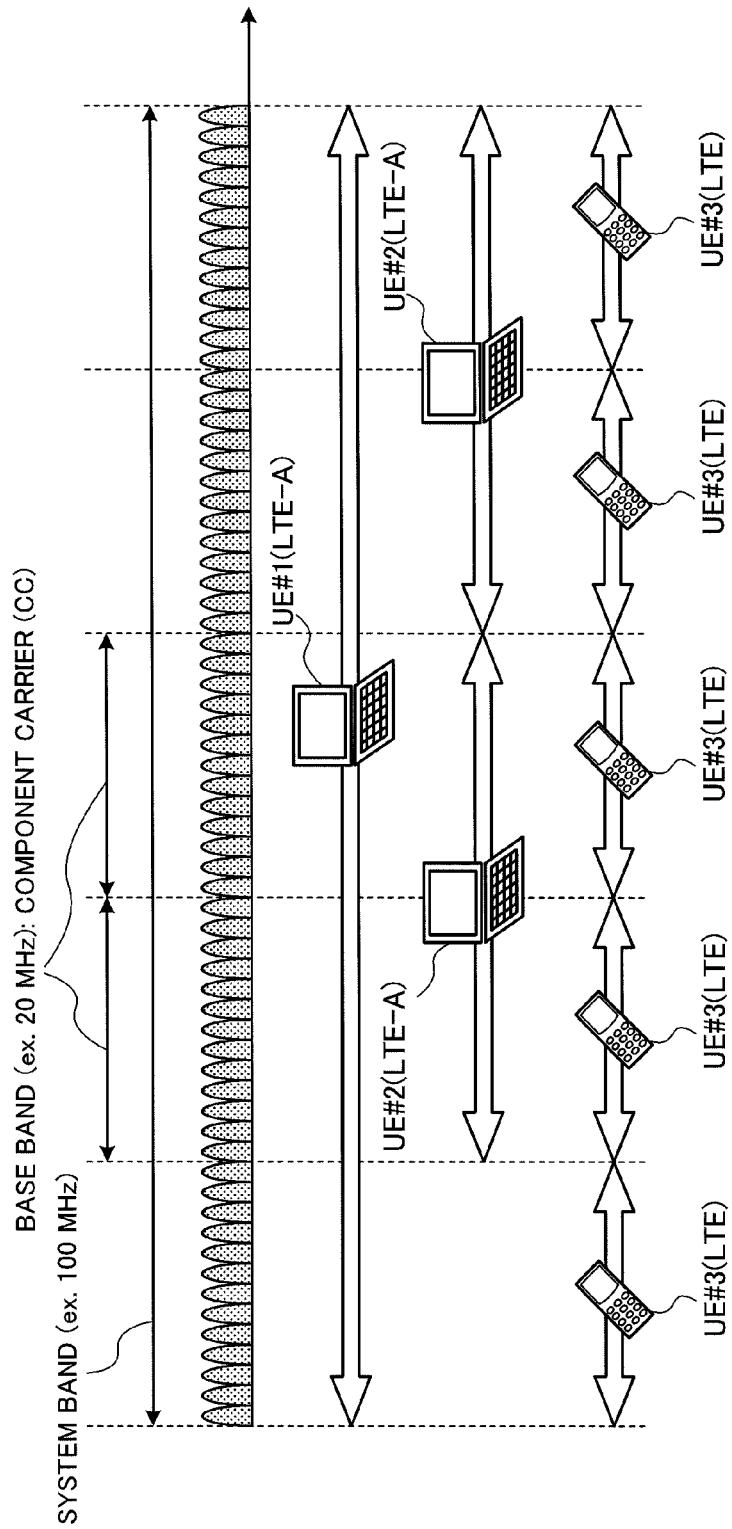
FIG. 1 is a diagram for explaining the system bands of LTE and LTE-A systems.

FIG. 1 is a diagram for explaining the system bands of the LTE and LTE-A systems. The example illustrated in FIG. 1 is a layered bandwidth configuration in the event where an LTE-A system, which is the first mobile communication system having the first system band formed with a plurality of fundamental frequency blocks, and an LTE system, which is a second mobile communication system having a second system band formed with one fundamental frequency block. In the LTE-A system, for example, radio communication is performed using a variable system bandwidth of 100 MHz or below, and, in the LTE system, radio communication is performed using a variable system bandwidth of 20 MHz or below. The system band for the LTE-A system is at least one of fundamental frequency blocks, each of which is the system band of the LTE system. In LTE-A, this fundamental frequency block is referred to as a "component carrier" (CC). Coupling a plurality of fundamental frequency blocks into a wide band in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, a mobile station apparatus UE (User Equipment) #1 is a mobile station apparatus to support the LTE-A system (and also support the LTE system), and supports a system band up to 100 MHz. UE #2 is a mobile station apparatus to support the LTE-A system (and also support the LTE system), and supports a system band up to 40 MHz (20 MHz×2=40 MHz). UE #3 is a mobile station apparatus to support the LTE system (and not support the LTE-A system), and supports a system band up to 20 MHz (base band).

Figure 2:
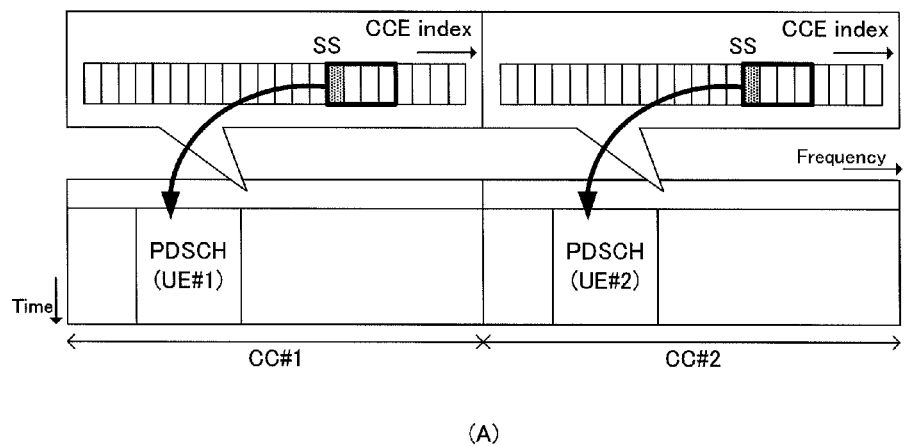
FIG. 2 is a schematic diagram for explaining a method of transmitting PDCCHs in the system band of the LTE-A system.
Figure 2:
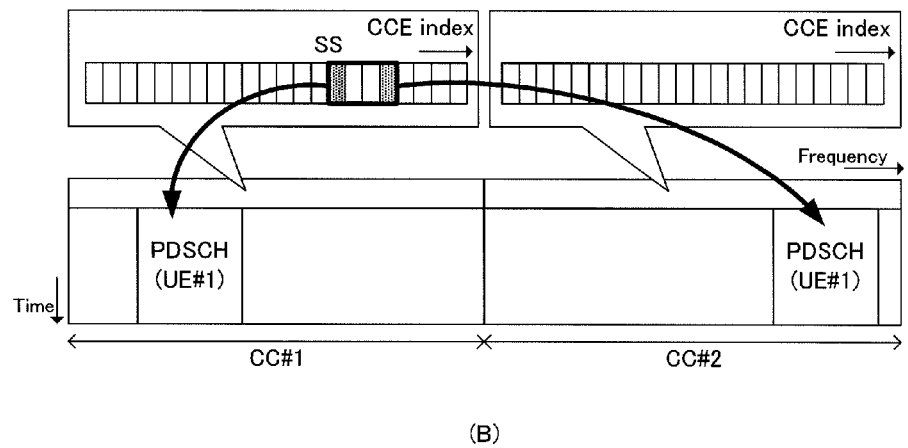

In this way, for the method of transmitting a PDCCH that is necessary to receive a PDSCH in radio communication in a widened system band, the methods shown in FIGS. 2(A) and (B) are possible. With the method illustrated in FIG. 2(A), a PDSCH and its PDCCH are transmitted by the same component carrier. To be more specific, a PDSCH (UE #1) for mobile station apparatus UE #1 is assigned to component carrier CC #1, and a PDSCH (UE #2) for mobile station apparatus UE #2 is assigned to different component carrier CC #2. A PDCCH, which is control information related to the PDSCH (UE #1), is transmitted by the same component carrier CC #1 as for the PDSCH (UE #1), and also a PDCCH, which is control information related to the PDSCH (UE #2), is transmitted by the same component carrier CC #2 as for the PDSCH (UE #2). User terminals acquire PDSCH control information by decoding the PDCCHs, and decode the PDSCHs according to that control information.

According to the method illustrated in FIG. 2(B), a PDCCH for PDSCHs that are respectively assigned to a plurality of (here, two) different component carriers, is transmitted by one component carrier. To be more specific, the PDSCH (UE #1) for mobile station apparatus UE #1 is assigned to component carriers CC #1 and CC #2. A PDCCH which is control information related to these PDSCHs (UE #1) is transmitted by component carrier CC #1. When a PDCCH is assigned in this way, a three-bit CIF (Carrier Indicator Field) in the PDCCH is used. In the CIF, only a PDCCH for a PDSCH that is assigned to a component carrier of the same DCI (Downlink Control Information) format size (i.e. the same bandwidth and the same transmission mode) can be assigned to one component carrier.

As illustrated in FIG. 2(B), in the event a PDCCH corresponding to the PDSCH (# UE1) assigned to component carrier CC #2 is assigned to component carrier CC #1, which is different from component carrier CC #2 to which that PDSCH (# UE1) is assigned, to define the same UE-specific search space as in the LTE system, the number of PDCCHs to correspond to UE #1 increases, and therefore the possibility of occurrence of PDCCH blocking might increase.

The present inventor has focused on the point that, to define the same UE-specific search space as in the LTE system, in the LTE-A system in which the system band is widened by carrier aggregation, the size of the UE-specific search space is insufficient for a PDSCH for a mobile station apparatus UE, and, assigning PDCCHs in that UE-specific search space causes the possibility of occurrence of PDCCH blocking to increase.

To cope with this situation, with the present invention, the size of the UE-specific search space is controlled adaptively, in a base station apparatus eNode B, according to the number of component carriers CCs to which a PDSCH for a mobile station apparatus UE is assigned. By this means, in the event the number of PDCCHs increases, the UE-specific search space can be enlarged, so that it becomes easier to avoid the situation where PDCCHs for other mobile station apparatus UE block, and therefore reduce the occurrence of PDCCH blocking. On the other hand, in the event the number of PDCCHs decreases (or becomes zero), the UE-specific search space can be reduced (or made smaller), so that it becomes possible to reduce the number of times of the blind detection process which increases in accordance with the search space size, and therefore reduce PDCCH detection errors.

When the size of the UE-specific search space is controlled adaptively in this way, a base station apparatus eNode B generates control information reflecting that control result, and reports this control information to mobile station apparatuses UEs, by RRC signaling, as information related to PDCCHs and PDSCHs. Now, a plurality of examples of reporting information related to PDCCHs and PDSCHs from a base station apparatus eNode B to mobile station apparatuses UEs will be explained below.

According to the first example of the present invention, a base station apparatus eNode B reports, to a mobile station apparatus UE, whether or not a PDCCH and a PDSCH are assigned (on/off) to the mobile station apparatus UE, for each component carrier CC constituting the system band, as information related to PDCCHs and PDSCHs. That is to say, with the first example, by reporting whether or not a PDSCH is assigned to a mobile station apparatus UE, the UE-specific search space, which is adaptively controlled through the number of PDSCHs to assign, is reported to the mobile station apparatus UE.

Figure 3:
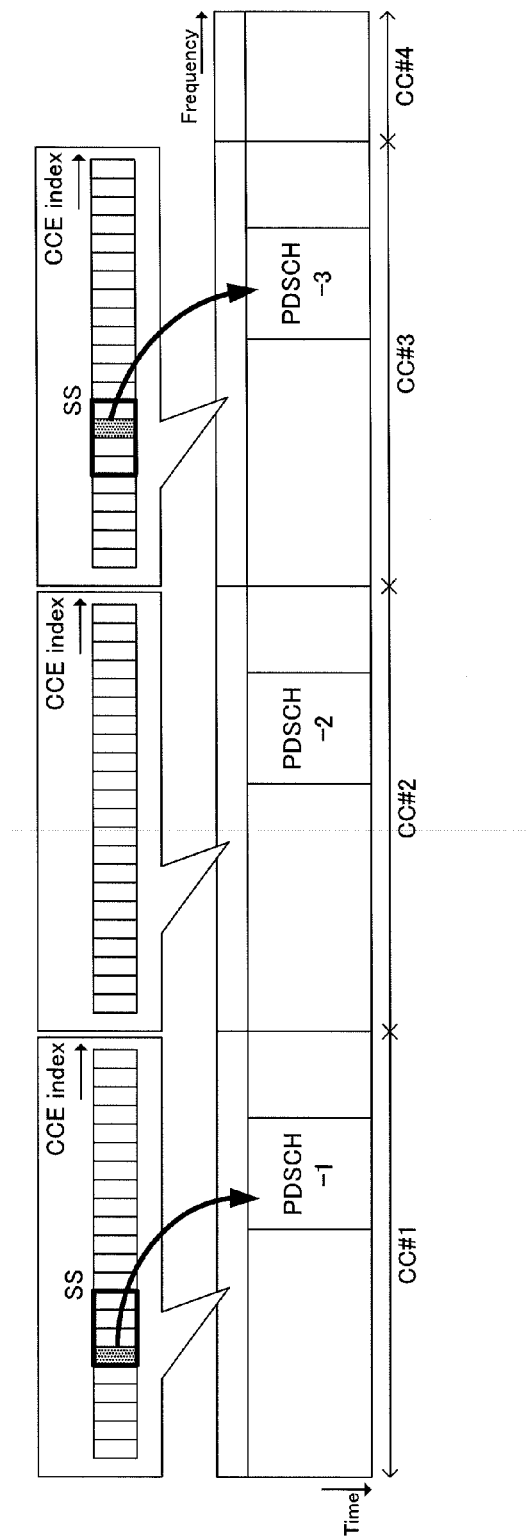
FIG. 3 is a schematic diagram for explaining information related to PDCCHs and PDSCHs that is reported from a base station apparatus to a mobile station apparatus according to the present invention.

FIG. 3 is a schematic diagram for explaining information related to PDCCHs and PDSCHs that is reported from a base station apparatus eNode B to a mobile station apparatus UE according to the first example of the present invention. Assume that, in FIG. 3, the system band is formed with component carriers CCs #1 to CC #4. Also, assume that component carriers CCs #1 to CC #3 have a 20 MHz band, and component carrier CC #4 has a 10 MHz band. Furthermore, assume that, for component carriers CCs #1, #2 and #4, the transmission mode is closed loop space multiplexing mode, and, for component carrier CC #3, the transmission mode is transmission diversity mode.

In the example illustrated in FIG. 3, PDSCH-1 to PDSCH-3, which correspond to mobile station apparatus UE #1, are assigned to component carrier CC #1 to #3, respectively, and no PDSCH is assigned to component carrier CC #4. Also, a PDCCH, which is control information related to PDSCHs-1 and 2, is assigned to component carrier CC #1, and a PDCCH, which is control information related to PDSCH-3, is assigned to component carrier CC #3.

In the first example, a base station apparatus eNode B reports that a PDCCH and a PDSCH are assigned with respect to component carrier CC #1, and reports that a PDCCH is not assigned and a PDSCH is assigned with respect to component carrier CC #2. Likewise, the base station apparatus eNode B reports that a PDCCH and a PDSCH are assigned with respect to component carrier CC #3, and reports that no PDCCH or PDSCH is assigned with respect to component carrier CC #4. Referring to the case where a PDCCH and a PDSCH are assigned as "on" and the case where a PDCCH and a PDSCH are not assigned as "off," the following is the content to be reported.

CC #1: PDSCH=ON, PDCCH=ON
CC #2: PDSCH=ON, PDCCH=OFF
CC #3: PDSCH=ON, PDCCH=ON
CC #4: PDSCH=OFF, PDCCH=OFF

The mobile station apparatus UE is able to learn the UE-specific search space depending on this report as to whether or not a PDSCH is assigned, and therefore is able to perform blind detection of a PDCCH, which is control information for the PDSCH for that mobile station apparatus UE, in a necessary range only. Also, since whether or not a PDCCH is assigned is reported, it is possible to learn to which component carriers CCs a PDCCH is not assigned, so that it is possible to reduce the number of times of the blind detection process and therefore reduce PDCCH detection errors.

According to a second example of the present invention, a base station apparatus eNode B reports, to the mobile station apparatus UE, whether or not a PDCCH and a PDSCH are assigned to a mobile station apparatus UE (on/off) for each component carrier CC constituting the system band and the size of the UE-specific search space, as information related to PDCCHs and PDSCHs. That is to say, in the second example, by reporting the size of the UE-specific search space, a UE-specific search space that is adaptively controlled is reported to the mobile station apparatus UE.

Here, in the event the size of the UE-specific search space is reported to the mobile station apparatus UE, it is preferable to determine information to identify the size of the UE-specific search space (hereinafter "size identification information") in advance and manage by means of this size identification information. For example, as size identification information, it is possible to define "size 1," which is constituted by a certain number of CCEs in a predetermined range, "size 2," which is constituted by CCEs twice those of size 1, and "size 3" and "size 4," which are constituted by CCEs three times and four times those of size 1, respectively. In the second example, the size of the UE-specific search space is reported to the mobile station apparatus UE using this size identification information.

Figure 4:
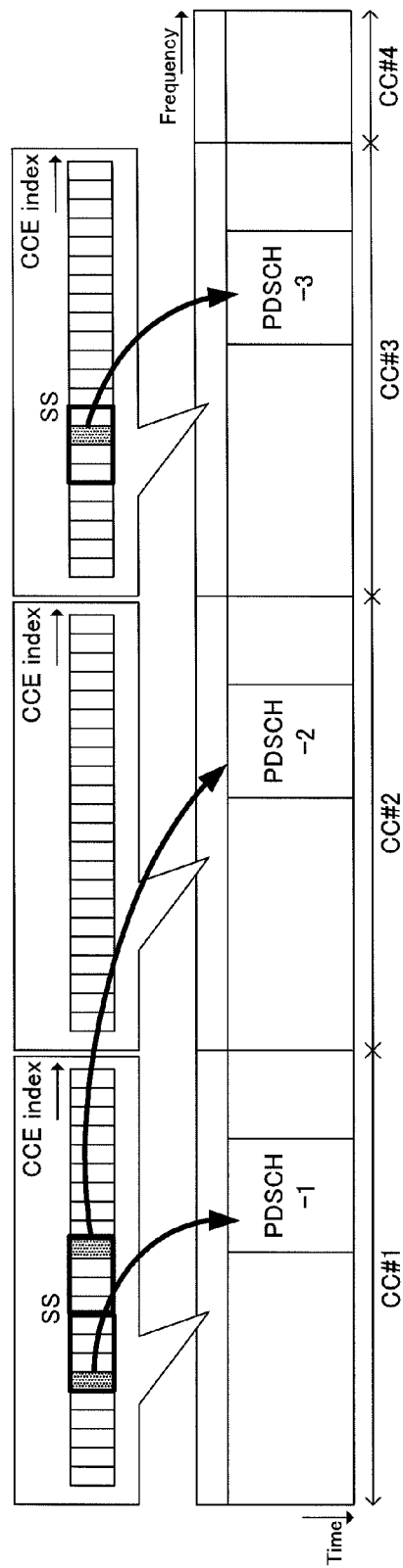
FIG. 4 is a schematic diagram for explaining information related to PDCCHs and PDSCHs that is reported from a base station apparatus to a mobile station apparatus according to the present invention.

To explain the second example using the example illustrated in FIG. 4, the base station apparatus eNode B reports, with respect to component carrier CC #1, that a PDCCH and a PDSCH are assigned, and also reports that the UE-specific search space is "size 2." Also, with respect to component carrier CC #2, the base station apparatus eNode B reports that a PDCCH is not assigned and that a PDSCH is assigned. With respect to component carrier CC #3, the base station apparatus eNode B reports that a PDCCH and a PDSCH are assigned, and also reports that the UE-specific search space is "size 1." With respect to component carrier CC #4, the base station apparatus eNode B reports that a PDCCH and a PDSCH are not assigned. Referring to the case where a PDCCH and a PDSCH are assigned as "on" and the case where a PDCCH and a PDSCH are not assigned as "off," the following is the content to be reported.

CC #1: PDSCH=ON, PDCCH=ON, SIZE 2
CC #2: PDSCH=ON, PDCCH=OFF
CC #3: PDSCH=ON, PDCCH=ON, SIZE 1
CC #4: PDSCH=OFF, PDCCH=OFF

The mobile station apparatus UE is able to learn the UE-specific search space depending on this report as to the UE-specific search space size, and therefore is able to perform blind detection of a PDCCH, which is control information for the PDSCH for that mobile station apparatus UE, in a necessary range only. Also, since whether or not a PDCCH is assigned is reported, it is possible to learn to which component carriers CCs a PDCCH is not assigned, so that it is possible to reduce the number of times of the blind detection process and therefore reduce PDCCH detection errors.

In a third example of the present invention, a base station apparatus eNode B reports, to a mobile station apparatus UE, the component carriers CCs, to which a PDCCH and a PDSCH are assigned based on the DCI format size (hereinafter "DCI size" as appropriate), and the size of the UE-specific search space, as information related to PDCCHs and PDSCHs. That is to say, in the third example, by reporting the size of the UE-specific search space, a UE-specific search space that is adaptively controlled is reported to the mobile station apparatus UE.

Figure 5:
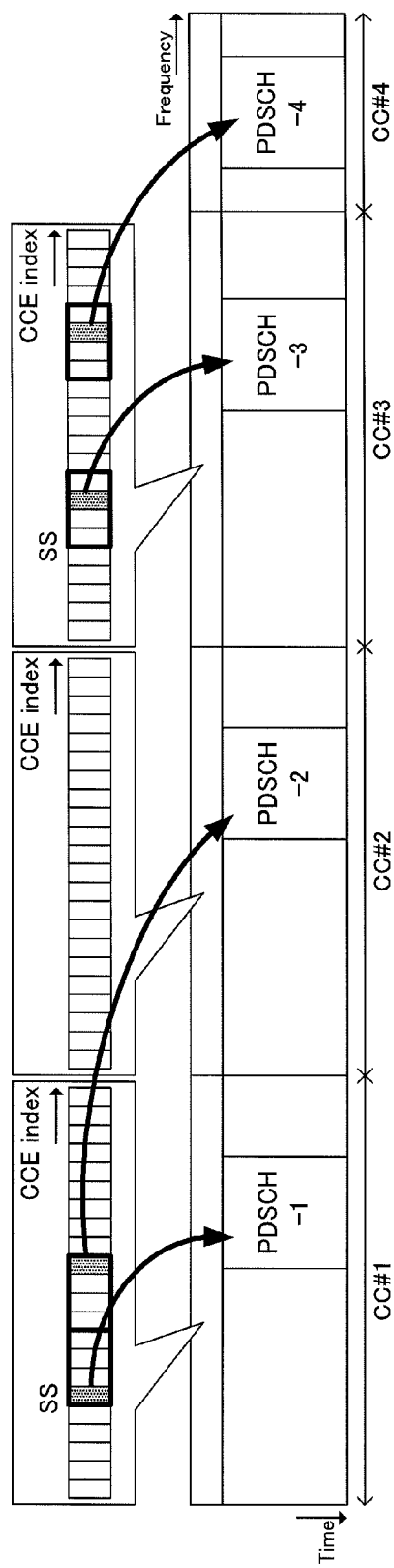
FIG. 5 is a schematic diagram for explaining information related to PDCCHs and PDSCHs that is reported from a base station apparatus to a mobile station apparatus according to the present invention.

FIG. 5 is a schematic diagram for explaining information which is related to PDCCHs and PDSCHs and which is reported from a base station apparatus eNode B to a mobile station apparatus UE, according to the third example of the present invention. In FIG. 5, the bands of component carrier CCs #1 to #4, which constitute the system band, and the transmission modes to be associated with these, are the same as in FIG. 3. The size of the UE-specific search space is reported using size identification information, as in the second example.

In the example illustrated in FIG. 5, PDSCH-1 to PDSCH-4 for mobile station apparatus UE #1 are assigned to component carriers CCs #1 to #4, respectively. Also, a PDCCH, which is control information related to PDSCHs-1 and 2, is assigned to component carrier CC #1, and a PDCCH, which is control information related to PDSCH-3 and 4, is assigned to component carrier CC #3.

Here, the DCI size is determined based on the band of component carriers CCs and transmission mode. In the example illustrated in FIG. 5, in component carriers CCs #1 and #2, the band is 20 MHz and the transmission mode is closed loop space multiplexing mode, and therefore the DCI size becomes the same (hereinafter referred to as "DCI size 1"). In component carrier CC #3, the band is 20 MHz, and this is the same as component carriers CCs #1 and #2, but the transmission mode is transmission diversity mode, and therefore the DCI size becomes different from that of component carriers CCs #1 and #2 (hereinafter referred to as "DCI size 2"). Likewise, in component carrier CC #4, the transmission mode is closed loop space multiplexing mode, and this is the same as component carriers CCs #1 and #2, but the band is 10 MHz, and therefore the DCI size becomes different from that of component carriers CCs #1 to #3 (hereinafter referred to as "DCI size 3").

In this case, the base station apparatus eNode B reports that a PDSCH corresponding to DCI size 1 is assigned to component carriers CCs #1 and #2 and that a PDCCH corresponding to DCI size 1 is assigned to component carrier CC #1, and furthermore reports that the UE-specific search space is "size 2." Also, the base station apparatus eNode B reports that a PDSCH corresponding to DCI size 2 is assigned to component carrier CC #3, and that a PDCCH corresponding to DCI size 2 is assigned to component carrier CC #3, and furthermore reports that the UE-specific search space is "size 1." Furthermore, the base station apparatus eNode B reports that a PDSCH corresponding to DCI size 3 is assigned to component carrier CC #4, and that a PDCCH corresponding to DCI size 3 is assigned to component carrier CC #3, and furthermore reports that the UE-specific search space is "size 1." Referring to the case where a PDCCH and a PDSCH are assigned as and the case where a PDCCH and PDSCH are not assigned as "off," the following is the content to be reported.

DCI size 1: PDSCH=CC #1 and #2, PDCCH=CC #1, SIZE 2
DCI size 2: PDSCH=CC #3, PDCCH=CC #3, SIZE 1
DCI size 3: PDSCH=CC #4 and #2, PDCCH=CC #3, SIZE 1

The mobile station apparatus UE is able to learn the UE-specific search space depending on this report as to the UE-specific search space size, and therefore is able to perform blind detection of a PDCCH, which is control information for the PDSCH for that mobile station apparatus UE, in a necessary range only. Also, since the component carriers CCs to which a PDCCH and a PDSCH are assigned are reported based on the DCI size, it is possible to learn to which component carriers CCs a PDCCH is not assigned, so that it is possible to reduce the number of times of the blind detection process and therefore reduce PDCCH detection errors. Furthermore, since the component carriers CCs to which a PDCCH and a PDSCH are assigned and the UE-specific search space size are reported based on the DCI size, it is possible to report information related to the same DCI size to the mobile station apparatus UE at the same time, so that it is possible to reduce the number of bits required for information related to PDCCHs and PDSCHs.

Presently, in the LTE-A system, from the perspective of reducing the power consumption of mobile station apparatuses UEs, activation/deactivation of component carriers CCs is under study. In this activation and deactivation of component carriers CCs, the mobile station apparatus UE switches between activation and deactivation of component carriers CCs to use for radio communication, and by this means reduces the power to be consumed by deactivated component carriers CCs, so that the power consumption of the mobile station apparatus UE is expected to be reduced. Also, in this activation/deactivation of component carriers CCs, from the perspective of the reliability of subsequent radio communication, there is a demand to report switch of activation/deactivation of component carriers CCs to the mobile station apparatus UE, reliably, and fast.

According to the first to third examples of the present invention, information related to PDCCHs and PDSCHs is reported from the base station apparatus eNode B to the mobile station apparatus UE via RRC signaling. The mobile station apparatus UE is able to learn to which component carriers CCs a PDCCH and PDSCH are assigned, according to the content of this report, and therefore is able to switch between activation and deactivation of component carriers CCs. In this case, information related to PDCCHs and PDSCHs is reported by RRC signaling, it is guaranteed that activation/deactivation of component carriers CCs is reliably reported to the mobile station apparatus UE. However, to report switch of activation/deactivation of component carriers CCs fast, even faster control is required. Consequently, in addition to information related to PDCCHs and PDSCHs, the base station apparatus eNode B reports setting information, which is necessary for switch between activation and deactivation of component carriers CCs (hereinafter referred to as "switching setting information"), to the mobile station apparatus UE, by RRC signaling, and also reports switching control information for switch between activation and deactivation of component carriers CCs (hereinafter "switching control information") by PDCCHs.

Below, a plurality of examples of reporting information related to PDCCHs and PDSCHs, switching setting information and switching control information, from a base station apparatus eNode to a mobile station apparatus UE will be described. Note that the following fourth example is different from the above-described first example in adding switching setting information to RRC signaling and reporting switching control information by PDCCHs. These differences will be primarily explained below.

In the fourth example of the present invention, a base station apparatus eNode B reports, as switching setting information, identification information which identifies a PDCCH and a PDSCH corresponding to each component carrier CC, and assignment information which represents whether or not the PDCCH and the PDSCH included in this identification information are assigned to component carriers CCs (on/off), to a mobile station apparatus UE, by RRC signaling. Then, after reporting this switching setting information, the base station apparatus eNode B reports switching control information, which switches on and off of assignment information included in the switching setting information to the mobile station apparatus UE, by PDCCHs.

Note that although a case is described here where a PDSCH and a PDCCH are made on/off at the same time, this method is by no means limiting, and it is equally possible to make both of these PDCCH and PDSCH on/off separately. Furthermore, since a PDSCH is at least a greater set than a PDCCH, it is possible to switch on/off of a corresponding PDCCH to follow on/off of a PDSCH, and, on the other hand, make the PDCCH alone off and not make the PDSCH off.

FIG. 6 is a diagram showing an example of switching setting information reported from the base station apparatus eNode B to the mobile station apparatus UE. As illustrated in FIG. 6, in the switching setting information, identification information ID #1 for identifying PDCCH #1 and PDSCH #1 that correspond to component carrier CC #1, and, likewise, identification information IDs #2 to #5 for identifying PDCCHs #2 to #5 and PDSCHs #2 to #5 that correspond to component carriers CCs #2 to #5, information to represent on/off of assignment of these identification information ID #1 to #5 to the component carriers CCs of PDCCHs #1 to #5 and PDSCHs #1 to #5, are defined.

The base station apparatus eNode B reports this switching setting information to the mobile station apparatus UE by RRC signaling. Here, the assignment information included in the switching setting information is all "on" and in this state reported to the mobile station apparatus UE. Then, in the event of cancelling the PDSCH assignment with respect to a specific component carrier CC, switching control information to make the assignment information corresponding to that component carrier CC off, is reported to the mobile station apparatus UE by the PDCCH. That is to say, in the mobile station apparatus UE, switching setting information including identification information in which all assignment information is on is reported by RRC signaling, and, switching control information to make assignment information corresponding to specific component carrier CC off, is reported by PDCCH.

A specific example of the fourth example will be explained. Assume here that a base station apparatus eNode B reports switching setting information in which all assignment information is on, to a mobile station apparatus UE, by RRC signaling. Now, assume that the base station apparatus eNode B performs radio communication with the mobile station apparatus UE by assigning a PDSCH to component carrier CCs #1 and #2. Assume here that the base station apparatus eNode B no longer needs to assign a PDSCH to component carrier CC #2 with the mobile station apparatus UE. In this case, the base station apparatus eNode B reports switching control information, which represents that the assignment of PDSCH #2 to component carrier CC #2 is off, by a PDCCH. In this case, the switching control information includes only identification information ID #2 and a signal to represent that the assignment information is off. By receiving this PDCCH, the mobile station apparatus UE is able to detect that there is no longer assignment of PDSCH #2 corresponding to component carrier CC #2.

In this way, according to the fourth example, in addition to information related to PDCCHs and PDSCHs, switching setting information in which all assignment information is on is reported to the mobile station apparatus UE, by RRC signaling, and also switching control information to make assignment information of specific identification information off, is reported to the mobile station apparatus UE, by PDCCHs. By this means, in addition to the advantage achieved by the above-described first example, it is possible to report switching setting information using RRC signaling which has excellent reliability, and also report switching control information using PDCCHs, which have excellent fast controllability, so that it is possible to report switch of activation and deactivation of component carriers CCs to the mobile station apparatus UE, reliably and fast.

A fifth example of the present invention is different from the above-described second example in adding switching setting information to RRC signaling and reporting switching control information by PDCCHs. Then, the contents of these switching setting information and switching control information are the same as in the fourth example. Consequently, with the fifth example, in addition to the advantage achieved by the above-described second example, it is possible to report switch of activation and deactivation of component carriers CCs to a mobile station apparatus UE, reliably and fast.

A sixth example of the present invention is different from the above-described third example in adding switching setting information to RRC signaling and reporting switching control information by PDCCHs. Then, the contents of these switching setting information and switching control information are the same as in the fourth example. Consequently, with the sixth example, in addition to the advantage achieved by the above-described third example, it is possible to report switch of activation and deactivation of component carriers CCs to a mobile station apparatus UE, reliably and fast.

Now, an embodiment of the present invention will be described below in detail with reference to the accompanying drawings. A case will be described here where a base station apparatus and mobile station apparatus to support the LTE-A system are used.

Figure 7:
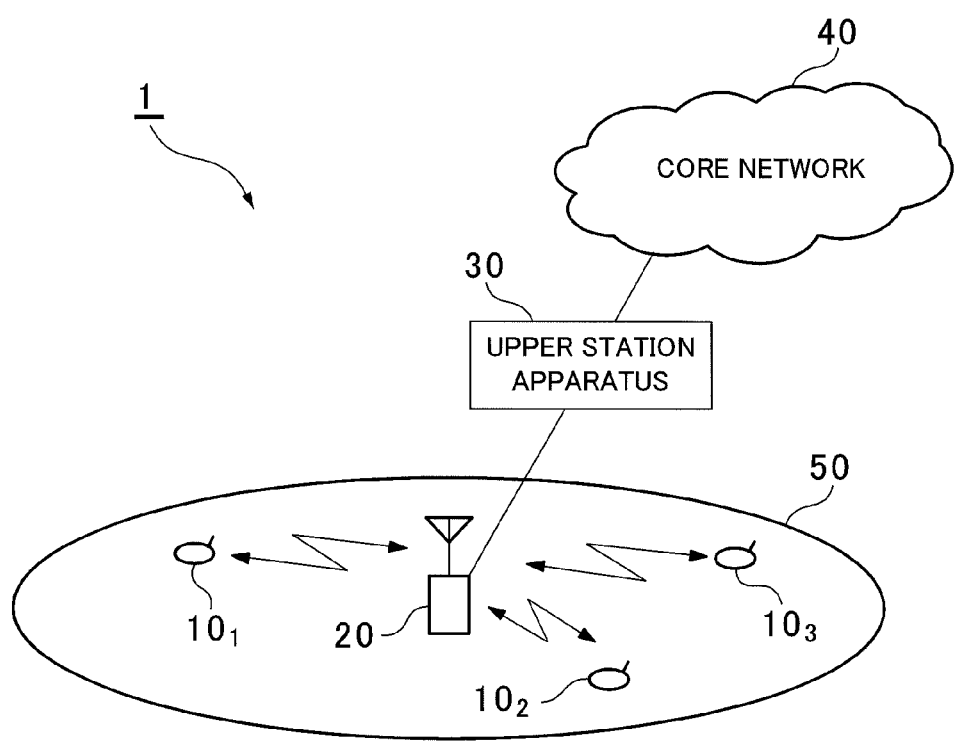
FIG. 7 is a diagram for explaining a configuration of a mobile communication system according to an embodiment of the present invention.

Referring to FIG. 7, a mobile communication system 1 having a mobile station apparatus (UE) 10 and a base station apparatus (eNode B) 20 according to an embodiment of the present invention will be described. FIG. 7 is a diagram for explaining the configuration of the mobile communication system 1 having the mobile station apparatus 10 and base station apparatus 20 according to the present embodiment. Note that the mobile communication systems 1 illustrated in FIG. 7 is a system to accommodate, for example, the LTE system or SUPER 3G. This mobile communication system 1 may be referred to as IMT-Advanced or may be referred to as 4G.

As illustrated in FIG. 7, the mobile communication system 1 is configured to include the base station apparatus 20 and a plurality of mobile station apparatuses 10 ($10_1$, $10_2$, $10_3$, . . . $10_n$, where n is an integer to satisfy n>0) that communicate with this base station apparatus 20. The base station apparatus 20 is connected with an upper station apparatus 30, and this upper station apparatus 30 is connected with a core network 40. The mobile station apparatus 10 communicates with the base station apparatus 20 in a cell 50. Note that the upper station apparatus 30 includes, for example, an access gateway apparatus, a radio network controller (RNC), a mobility management entity (MME) and so on, but is by no means limited to these.

The mobile station apparatuses ($10_1$, $10_2$, $10_3$, . . . $10_n$) have the same configuration, functions and state, so that the following description will be given with respect to "mobile station apparatus 10," unless specified otherwise. Also, although the mobile station apparatus 10 performs radio communication with the base station apparatus 20 for ease of explanation, more generally, user apparatuses (UE: User Equipment) including mobile station apparatuses and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands.

Here, the communication channels in the LTE system will be described. As for the downlink, a PDSCH that is used by each mobile station apparatus 10 on a shared basis, and downlink L1/L2 control channels (including PDCCH, PCFICH, and PHICH) are used. By means of this PDSCH, user data, that is, normal data signals, is transmitted. Transmission data is included in this user data. Note that the component carriers CCs and scheduling information that are assigned to the mobile station apparatus 10 by the base station apparatus 20 are reported to the mobile station apparatus 10 by the L1/L2 control channels.

On the uplink, a PUSCH (Physical Uplink Shared Channel), which is used by each mobile station apparatus 10 on a shared basis, and a PUCCH (Physical Uplink Control Channel), which is an uplink control channel, are used. User data is transmitted by means of this PUSCH. Furthermore, by means of this PUCCH, downlink radio quality information (CQI: Channel Quality Indicator) and so on are transmitted.

Figure 8:
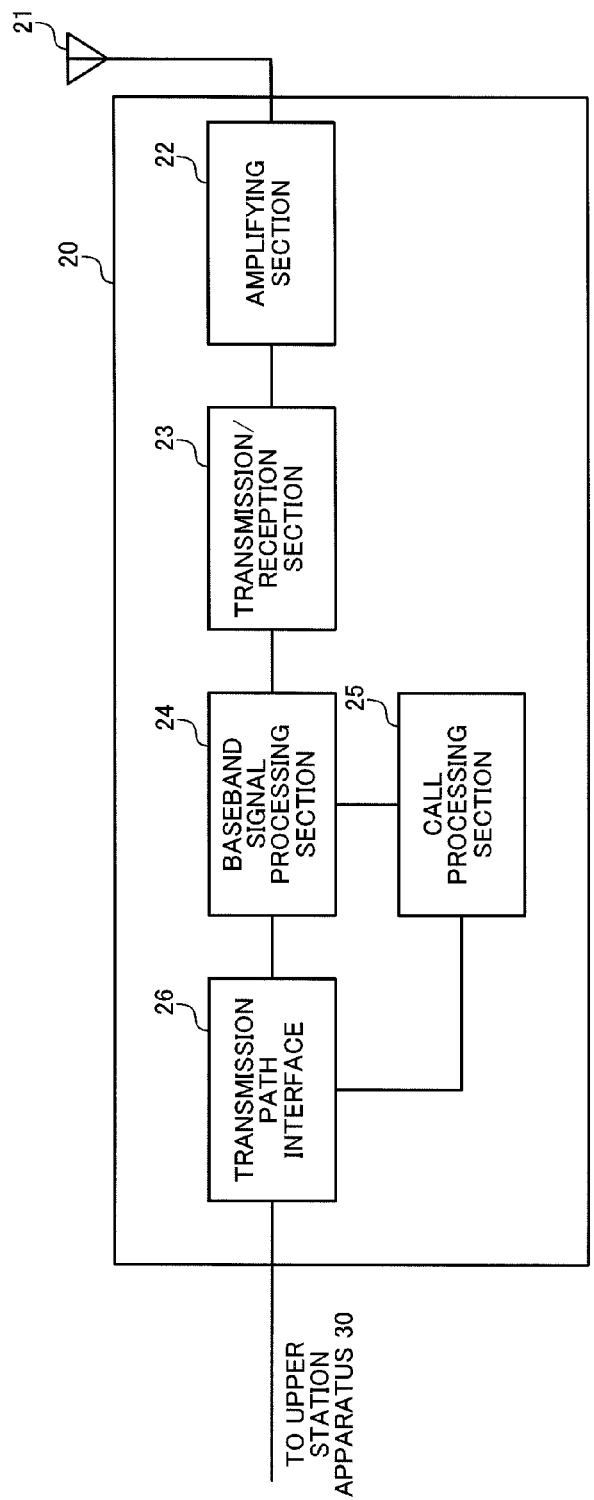
FIG. 8 a block diagram showing an overall configuration of a base station apparatus according to the above embodiment.

Referring to FIG. 8, an overall configuration of the base station apparatus 20 according to the present embodiment will be described. The base station apparatus 20 has a transmission/reception antenna 21, an amplifying section 22, a transmission/reception section 23, baseband signal processing section 24, a call processing section 25 and a transmission path interface 26. These transmission/reception antenna 21, amplifying section 22, transmission/reception section 23, and baseband signal processing section 24 constitute a transmission section.

User data that is transmitted on the downlink from the base station apparatus 20 to the mobile station apparatus 10 is input in the baseband signal processing section 24, through the transmission path interface 26, from the upper station apparatus 30 which is positioned above the base station apparatus 20.

In the baseband signal processing section 24, PDCP layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing, are performed. Furthermore, as with signals of the physical downlink control channel, which is a downlink control channel, transmission processing such as channel coding and inverse fast Fourier transform are performed, and the result is transferred to the transmission/reception section 23.

In the transmission/reception section 23, the baseband signal output from the baseband signal processing section 204 is subjected to frequency conversion processing into a radio frequency band, and, after that, amplified in the amplifying section 22 and transmitted from the transmission/reception antenna 21.

Meanwhile, as for signals to be transmitted on the uplink from the mobile station apparatus 10 to the base station apparatus 20, a radio frequency signal that is received in the transmission/reception antenna 21 is amplified in the amplifying section 22, subjected to frequency conversion and converted into a baseband signal in the transmission/reception section 23, and is input to the baseband signal processing section 24.

The baseband signal processing section 24 performs FFT processing, IDFT processing, error correction decoding, MAC retransmission control reception processing, and RLC layer and PDCP layer reception processing of the user data included in the baseband signal that is received as input, and transfers the result to the upper station apparatus 30 through the transmission path interface 26.

The call processing section 205 performs call processing such as setting up and releasing a communication channel, manages the state of the base station apparatus 20 and manages the radio resources.

Figure 9:
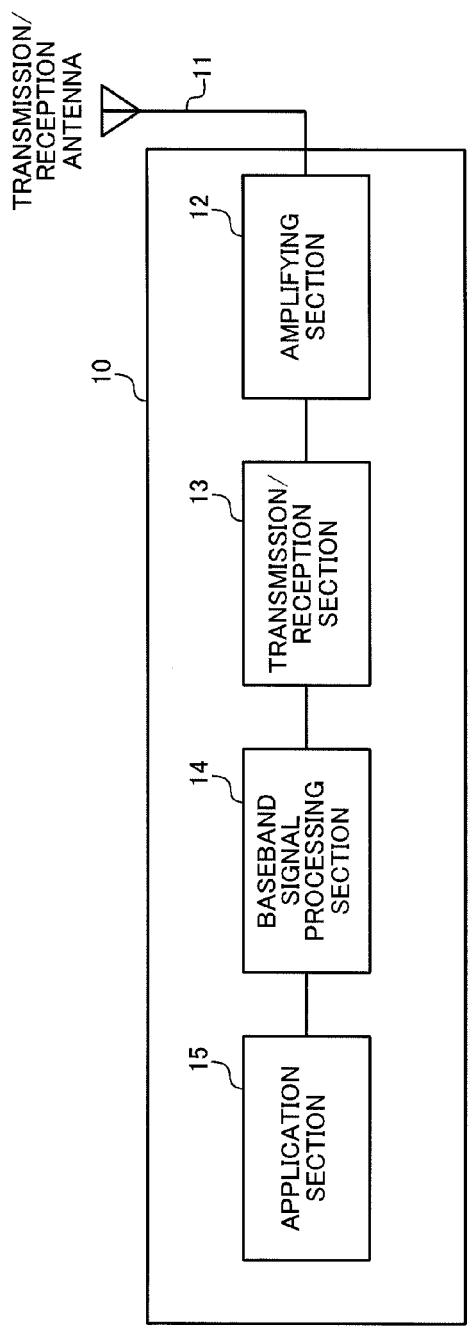
FIG. 9 is a block diagram showing an overall configuration of a mobile station apparatus according to the above embodiment.

Next, referring to FIG. 9, an overall configuration of the mobile station apparatus 10 according to the present embodiment will be described. An LTE terminal and an LTE-A terminal have the same principle part configurations and therefore will be described with no distinction. The mobile station apparatus 10 has a transmission/reception antenna 11, an amplifying section 12, a transmission/reception section 13, a baseband signal processing section 14 and an application section 15. These transmission/reception antenna 11, amplifying section 12, transmission/reception section 13 and part of the baseband signal processing section 14 constitute a receiving section.

As for downlink data, a radio frequency signal received in the transmission/reception antenna 11 is amplified in the amplifying section 12, and subjected to frequency conversion and converted into a baseband signal in the transmission/reception section 13. This baseband signal is subjected to reception processing such as FFT processing, error correction decoding and retransmission control reception processing and so on in the baseband signal processing section 14. In this downlink data, downlink user data is transferred to the application section 15. The application section 15 performs processing related to upper layers above the physical layer and the MAC layer. Also, in the downlink data, broadcast information is also transferred to the application section 15.

On the other hand, uplink user data is input from the application section 15 to the baseband signal processing section 14. In the baseband signal processing section 14, retransmission control (HARQ (Hybrid ARQ)) transmission processing, channel coding, DFT processing, IFFT processing and so on are performed, and the result is transferred to the transmission/reception section 13. The baseband signal output from the baseband signal processing section 14 is subjected to frequency conversion processing in the transmission/reception section 13 and converted into a radio frequency band, and, after that, amplified in the amplifying section 12 and transmitted from the transmission/reception antenna 11.

Figure 10:
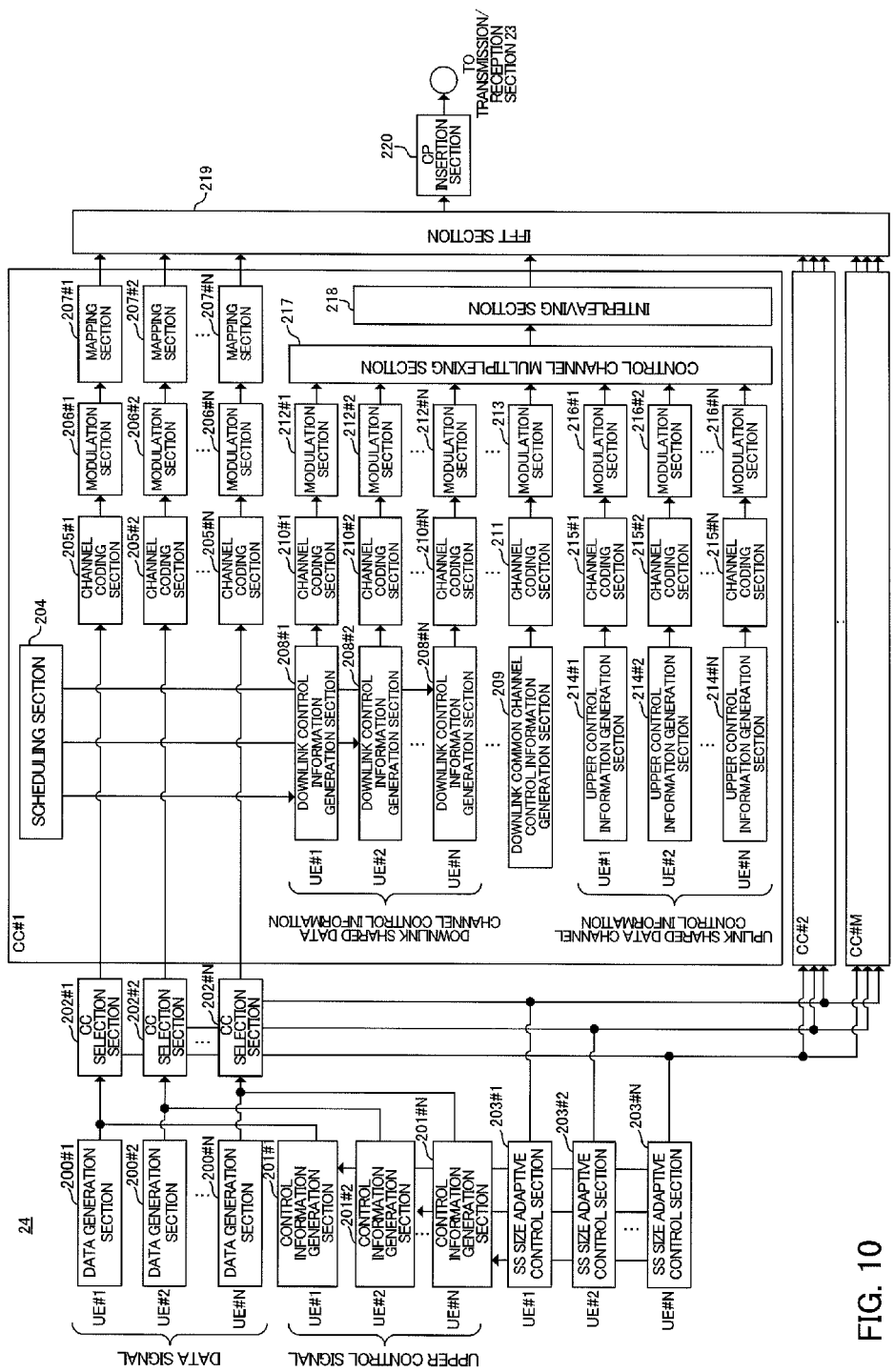
FIG. 10 is a functional block diagram of a baseband signal processing section provided in a base station apparatus according to the above embodiment.

FIG. 10 is a functional block diagram of a baseband signal processing section 24 provided in the base station apparatus 20 according to the present embodiment, and primarily illustrates the function blocks of the transmission processing section in the baseband signal processing section 24. Note that a downlink configuration will be described with reference to FIG. 10 where transmission data for the mobile station apparatus 10 under the base station apparatus 20 is transferred from the upper station apparatus 30 to the base station apparatus 20. Also, in FIG. 10, a configuration of the base station apparatus 20 to support the mobile communication system 1 where the number of component carriers is M (CC #1 to CC #M) is illustrated as an example.

A data generation sections 200 (200 #1 to 200 #N) generate user data on a per user basis, from transmission data transferred from the upper station apparatus 30. The control information generation sections 201 (201 #1 to 201 #N) constitute a control information generation section, and generate, on a per user basis, upper control signals to report to the mobile station apparatus 10 by RRC signaling, including the above-described information related to PDCCHs and PDSCHs and switching setting information. In the first example, upper control signals, including whether or not a PDCCH and a PDSCH are assigned to the mobile station apparatus 10 for each component carrier CC are generated on a per user basis, and, in the second example, in addition to this, upper control signal, including the size of the UE-specific search space, are generated on a per user basis. Furthermore, in the third example, upper control signals including the component carriers CCs to which PDCCHs and PDSCHs are assigned based on the DCI sizes and the UE-specific search space size are generated. Furthermore, in the fourth to sixth examples, in addition to the upper control signals of the first to third examples, upper control signals including identification information and assignment information are generated.

Component carrier selection sections 202 (202 #1 to 202 #N) select component carriers to use in radio communication with the mobile station apparatus 10, on a per user basis. Search space (SS) size adaptive control section 203 (203 #1 to 203 #N) constitute a control section, and controls the size of the UE-specific search space adaptively, on a per user basis, depending on the number of component carriers selected by the component carrier selection sections 202. Information related to the size of the UE-specific search space controlled adaptively by the SS size adaptive control sections 221 is input in the control information generation sections 201, and is used to generate upper control signals.

The scheduling section 204 controls resource allocation with respect to component carrier CC #1 and performs scheduling separately between the LTE terminal user and the LTE-A terminal user. Also, the transmission data and retransmission command from the upper station apparatus 30 are input to the scheduling section 204, and also the channel estimation values and resource block CQIs are input from the reception section having measured an uplink signal. The scheduling section 204 schedules uplink/downlink control signals and uplink/downlink shared channel signals with reference to the retransmission command input from the upper station apparatus 30, the channel estimation values and CQIs. A propagation path in mobile communication varies differently per frequency, due to frequency selective fading. So, upon transmission of user data to a user terminal, adaptive frequency scheduling to assign resource blocks of good communication quality to each user terminal on a per subframe basis is used. In adaptive frequency scheduling, for each resource block, a user terminal of good propagation path quality is selected and assigned. Consequently, the scheduling section 204 assigns resource blocks using the CQI of each resource block, fed back from each user terminal. Also, the MCS (Coding rate and Modulation Scheme) that fulfills a required block error rate with the assigned resource blocks is determined.

The baseband signal processing section 24 has channel coding sections 205 (205 #1 to 205 #N) that perform, on a per user basis, channel coding of user data output from the data generation sections 200 and the shared data channel (PDSCH) that transmits control signals output from the control information generation sections 201, modulation sections 206 (206 #1 to 206 #N) that modulate transmission data having been subjected to channel coding, on a per user basis, and mapping sections 207 (207 #1 to 207 #N) that maps the modulated transmission data to radio resources.

Also, the baseband signal processing section 24 has downlink control information generation sections 208 (208 #1 to 208 #N) that generate downlink shared data channel control information, which is user-specific downlink control information, and a downlink common control channel control information generation section 209 that generates downlink common control channel control information, which is downlink control information that is common between users. The downlink control information generation sections 208 constitute a switching control information generation section, and generate, on a per user basis, control signals to report to the mobile station apparatus 10 by PDCCHs, including the above-described switching control information. The baseband signal processing section 24 has channel coding sections 210 (210 #1 to 210 #N) that perform, on a per user basis, channel coding of the control information that is generated in the downlink control information generation sections 208, a channel coding section 211 that performs channel coding of downlink common control channel control information that is generated in the downlink common channel control information generation section 209, and modulation sections 212 (212 #1 to 212 #N) and 213 that modulate downlink control information having been subjected to channel coding in the channel coding sections 210 and 211.

Also, the baseband signal processing section 24 has uplink control information generation sections 214 (214 #1 to 214 #N) that generates, on a per user basis, uplink shared data channel control information, which is control information for controlling the uplink shared data channel (PUSCH), channel coding sections 215 (215 #1 to 215 #N) that perform, on a per user basis, channel coding of uplink shared data channel control information that is generated, and modulation sections 216 (216 #1 to 216 #N) that modulate uplink shared data channel control information having been subjected to channel coding, on a per user basis.

The uplink control information generation sections 214 generate uplink shared data channel control information separately between the LTE terminal user and the LTE-A terminal user.

Control information modulated in the above modulation sections 212, 213 and 216, on a per user basis, is multiplexed in a control channel multiplexing section 217, and furthermore interleaved in an interleaving section 218. Control signals output from the interleaving section 218 and transmission data output from the mapping section 217 are input in an IFFT section 219. The IFFT section 219 converts the downlink channel signal from a frequency domain signal into a time sequence signal by performing an inverse fast Fourier transform. A cyclic prefix (CP) insertion section 220 inserts cyclic prefixes in the time sequence signal of the downlink channel signal. Note that a cyclic prefix functions as a guard interval for cancelling the differences in multipath propagation delay. The transmission data, to which cyclic prefixes are added, is transmitted to the transmission/reception section 23.

In this way, in the base station apparatus 20, the size of the UE-specific search space is controlled adaptively, on a per user basis, by the SS size adaptive control section 221, depending on the number of component carriers. By this means, it is possible to adjust the size of the UE-specific search space on an adaptive basis in accordance with PDCCHs. As a result of this, in the event the number of PDCCHs increases, the UE-specific search space can be enlarged, so that it becomes easier to avoid the situation where PDCCHs for other mobile station apparatuses UEs block, and therefore reduce the occurrence of PDCCH blocking. On the other hand, in the event the number of PDCCHs decreases (or becomes zero), the UE-specific search space can be reduced (or made smaller), so that it becomes possible to reduce the number of times of the blind detection process which increases in accordance with the search space size, and therefore reduce PDCCH detection errors.

Also, in the base station apparatus 20, based on the UE-specific search space size controlled adaptively in this way, the control information generation sections 201 generate upper control signals to report to the mobile station apparatus 10 by RRC signaling, on a per user basis, including information related to PDCCHs and PDSCHs and switching setting information. By this means, it becomes possible to report, by RRC signaling, information related to PDCCHs and PDSCHs and switching setting information to the mobile station apparatus 10 reliably.

Figure 11:
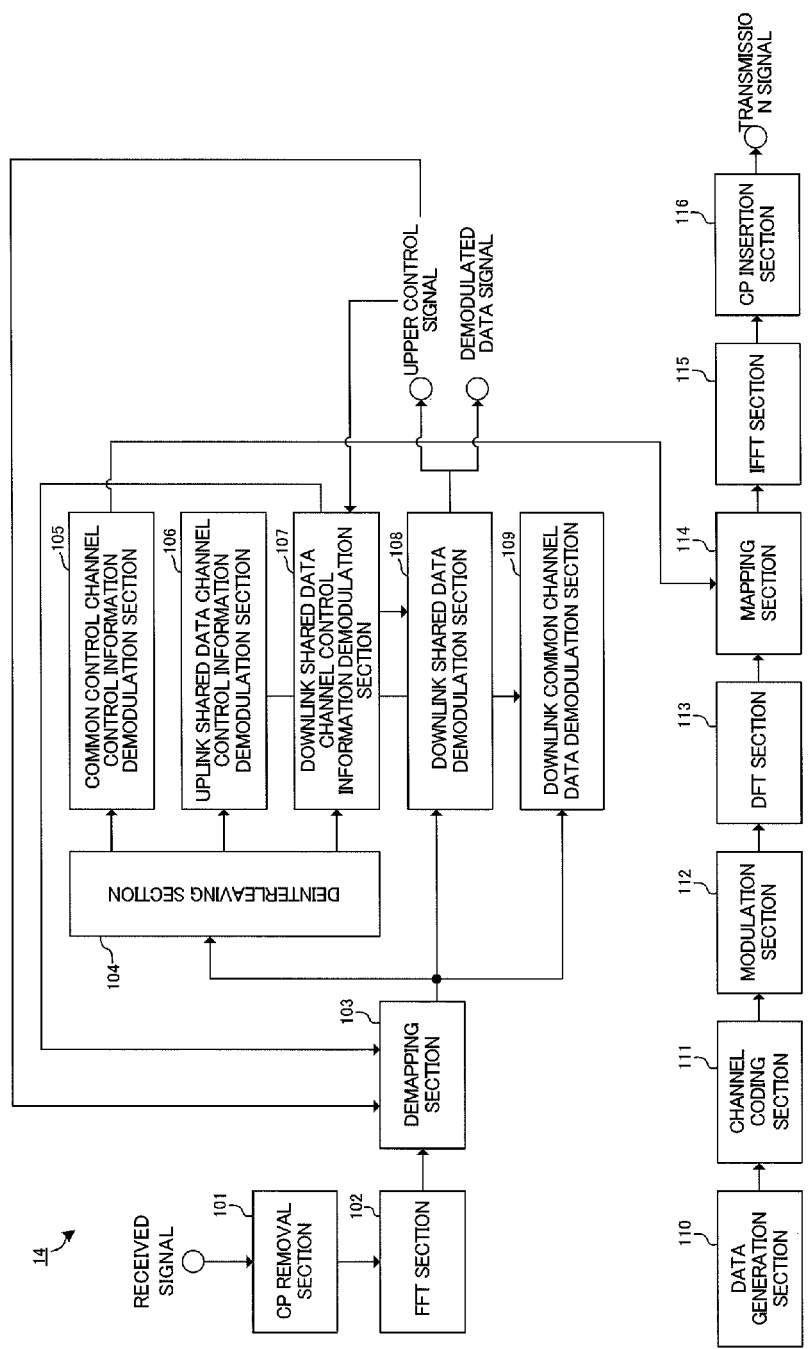
FIG. 11 is a functional block diagram of a baseband signal processing section provided in a mobile station apparatus according to the above embodiment.

FIG. 11 is a functional block diagram of a baseband signal processing section 14 provided in a mobile station apparatus 10 according to the present embodiment, and primarily illustrates the function blocks of the transmission processing section in the baseband signal processing section 14. First, the downlink configuration of the mobile station apparatus 10 will be described.

From A downlink channel signal that is received as received data from the base station apparatus 20, a cyclic prefix removing section 101 removes the cyclic prefixes. The downlink channel signal, from which the cyclic prefixes have been removed, is input in an FFT section 102. The FFT section 102 converts the downlink channel signal from a time sequence signal into a frequency domain signal through a fast Fourier transform (FFT), and inputs the frequency domain signal in a demapping section 103. The demapping section 103 demaps the downlink channel signal and extracts, from the downlink channel signal, multiplex control information in which a plurality of pieces of control information are multiplexed, user data, and upper control signals. Although the demapping process in the demapping section 103 is performed based on the upper control signals input from the application section 15, this demapping process will be described later. The multiplex control information output from the demapping section 103 is deinterleaved in a deinterleaving section 104.

Also, the baseband signal processing section 14 has a common control channel control information demodulation section 105 that demodulates downlink common control channel control information from multiplex control information, an uplink shared data channel control information demodulation section 106 that demodulates uplink shared data channel control information from multiplex control information, a downlink shared data channel control information demodulation section 107 that demodulates downlink shared data channel control information from multiplex control information, a downlink shared data demodulation section 108 that demodulates user data and upper control signals, and a downlink common channel data demodulation section 109 that demodulates downlink common channel data.

The common control channel control information demodulation section 105 extracts common control channel control information, which is control information that is common between users, by performing, for example, blind decoding processing of the common search space (UE-common search space) of multiplex control information (PDCCH), demodulation processing, channel decoding processing and so on. The common control channel control information includes downlink channel quality information (CQI), is input in a mapping section 114 (described later), and mapped as part of transmission data for the radio base station apparatus 20.

The uplink shared data channel control information demodulation section 106 extracts uplink shared data channel control information, which is user-specific uplink control information, by performing the blind decoding processing of the user-specific search space of multiplex control information (PDCCH), demodulation processing, channel decoding processing and so on. The uplink shared data channel control information is used to control the uplink shared data channel (PUSCH), and is input in the downlink common channel data demodulation section 109.

The downlink shared data channel control information demodulation section 107 constitutes a detection section, and extracts downlink shared data channel control information, which is user-specific downlink control signals, by performing the blind decoding processing of the user-specific search space of multiplex control information (PDCCH), demodulation processing, channel decoding processing and so on. The downlink shared data channel control information is used to control the downlink shared data channel (PDSCH), and is input in the downlink shared channel data demodulation section 108. In the event the downlink shared control channel control information includes the above-described switching control information, the switching control information is input in the demapping section 103, and used to extract the multiplex control information (PDCCH) and user data (PDSCH).

Also, the downlink shared data channel control information demodulation section 107 performs the blind decoding process of the UE-specific search space, based on above-described information related to PDCCHs and PDSCHs included in the upper control signals demodulated in the downlink shared data demodulation section 108. For example, in the first example, according to the number of PDSCHs for the mobile station apparatus 10, the UE-specific search space is learned and the blind decoding process is performed. In the second and third examples, according to the size of the UE-specific search space, the UE-specific search space is learned, and the blind decoding process is performed.

The downlink shared data modulation section 108 acquires user data based on downlink shared data channel control information input from the downlink shared data channel control information demodulation section 107. The downlink common channel data demodulation section 109 demodulates downlink common channel data, based on uplink shared data channel control information that is input from the uplink shared data channel control information demodulation section 106.

The demodulated data signals and upper control signals are input in the application section 15. The above-described information related to PDCCHs and PDSCHs included in the upper control signals is input from the application section 15 to the downlink shared data channel control information demodulation section 107, and is used upon the blind decoding process of the UE-specific search space. Also, these information related to PDCCHs and PDSCHs and switching setting information are input from the application section 15 to the demapping section 103, and used to extract the multiplex control information (PDCCH) and user data (PDSCH).

The demapping section 103 constitutes a switching section, and performs the demapping process according to the above-described first to sixth examples, based on the information related to PDCCHs and PDSCHs and switching setting information from the application section 15. For example, in the first and second examples, PDCCHs and PDSCHs are extracted depending on whether or not PDCCHs and PDSCHs are assigned to the mobile station apparatus 10. In the third example, depending on the component carriers CCs to which PDCCHs and PDSCHs are assigned based on the DCI size, PDCCHs and PDSCHs are extracted. In the fourth to sixth examples, PDCCHs and PDSCHs are extracted depending on switching control information input from the downlink shared data channel control information demodulation section 107, in addition to switching setting information.

Next, the uplink configuration of the mobile station apparatus 10 will be described. The data generation section 110 generates uplink user data. The channel coding section 111 performs channel coding of user data output from the data generation section 110. The modulation section 112 modulates the transmission data having been subjected to channel coding in the channel coding section 111. The DFT section 113 converts the modulated transmission data from a time sequence signal into a frequency domain signal by performing discrete Fourier transform (DFT), and inputs this frequency domain signal in the mapping section 114. The mapping section 114 maps the transmission data to radio resources based on assignment information that is reported on the downlink. The IFFT section 115 performs an inverse fast Fourier transform of the transmission data and converts the frequency domain signal into a time sequence signal. The cyclic prefix insertion section 116 inserts cyclic prefixes in the time sequence signal of transmission data. The transmission signal to which cyclic prefixes have been added is transmitted to transmission/reception section 13.

In this way, in the mobile station apparatus 10, blind detection of the UE-specific search space is performed in the downlink shared data channel control information demodulation section 107 based on the information related to PDCCHs and PDSCHs included in upper control signals. By this means, PDCCH blind detection can be performed in a UE-specific search space that is adaptively controlled in the base station apparatus 20, so that it is possible to perform blind detection of a PDCCH, which is control information for the PDSCH for that mobile station apparatus UE, in a necessary range only.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

For example, referring to the above embodiments, although cases have been described with the fourth to sixth examples where switching control information is reported to the mobile station apparatus UE using PDCCHs, the control signals to use to report switching control information are by no means limited to PDCCHS and can be changed as appropriate. For example, it is possible to report switching control information using MAC layer signals. MAC layer signals can transmit information faster than RRC signaling, so that it is possible to report to the mobile station apparatus UE switch of activation and deactivation of component carriers CCs reliably and fast.

The disclosure of Japanese Patent Application No. 2010-003495, filed on Jan. 11, 2010, including the specification, drawings, and abstract, is incorporated herein by reference in its entirety.

The invention claimed is:

1. A base station apparatus comprising:
   a control section configured to adaptively control a size of a UE-specific search space depending on the number of component carriers to which a PDSCH for a mobile station apparatus is assigned;
   a control information generation section configured to generate control information reflecting a control result by the control section; and
   a transmission section configured to transmit the control information to the mobile station apparatus by RRC signaling.

2. The base station apparatus according to claim 1, wherein the control information generation section is configured to generate the control information including whether or not a PDCCH and the PDSCH are assigned to the mobile station apparatus for each component carrier.

3. The base station apparatus according to claim 2, further comprising a switching control information generation section configured to generate switching control information which switches activation and deactivation of each component carrier, wherein:
   the control information generation section is configured to generate the control information including setting information that is necessary for a switch of activation and deactivation of each component carrier; and
   the transmission section is configured to transmit the control signal to the mobile station apparatus by RRC signaling, and include the switching control information in the PDCCH to transmit to the mobile station apparatus.

4. The base station apparatus according to claim 3, wherein:
   the setting information includes identification information for identifying a PDCCH and a PDSCH corresponding to each component carrier, and assignment information which indicates whether or not the PDCCH and the PDSCH corresponding to the identification information are assigned to each component carrier; and
   the switching control information includes information for switching assignment and non-assignment by the assignment information.

5. The base station apparatus according to claim 1, wherein the control information generation section is configured to generate the control information including whether or not a PDCCH and the PDSCH are assigned to the mobile station apparatus for each component carrier and the size of the UE-specific search space.

6. The base station apparatus according to claim 5, further comprising a switching control information generation section configured to generate switching control information which switches activation and deactivation of each component carrier, wherein:
   the control information generation section is configured to generate the control information including setting information that is necessary for a switch of activation and deactivation of each component carrier; and
   the transmission section is configured to transmit the control signal to the mobile station apparatus by RRC signaling, and include the switching control information in the PDCCH to transmit to the mobile station apparatus.

7. The base station apparatus according to claim 1, wherein the control information generation section is configured to generate the control information including a component carrier, to which a PDCCH and the PDSCH for the mobile station apparatus are assigned based on a DCI format size, and the size of the UE-specific search space.

8. The base station apparatus according to claim 7, further comprising a switching control information generation section configured to generate switching control information which switches activation and deactivation of each component carrier, wherein:
   the control information generation section is configured to generate the control information including setting information that is necessary for a switch of activation and deactivation of each component carrier; and
   the transmission section is configured to transmit the control signal to the mobile station apparatus by RRC signaling, and include the switching control information in the PDCCH to transmit to the mobile station apparatus.

9. A mobile station apparatus comprising:
   a receiving section configured to receive, from a base station apparatus, by RRC signaling, control information which reflects a size of a UE-specific search space controlled adaptively depending on the number of component carriers to which a PDSCH for the mobile station apparatus is assigned; and
   a detection section configured to execute a blind detection process of the UE-specific search space designated by the control information.

10. The mobile station apparatus according to claim 9, wherein:
    the receiving section is configured to receive the control information including whether or not a PDCCH and the PDSCH are assigned to the mobile station apparatus for each component carrier; and
    the detection section is configured to execute the blind detection process of the UE-specific search space depending on whether or not the PDCCH and the PDSCH are assigned to the mobile station apparatus, included in the control information.

11. The mobile station according to claim 10, further comprising a switching section configured to switch activation and deactivation of each component carrier, wherein:
    the receiving section is configured to receive the control information including setting information that is necessary for a switch of activation and deactivation of each component carrier, by RRC signaling, and receive the PDCCH including switching control information which switches the activation and deactivation of each component carrier; and
    the switching section is configured to switch the activation and deactivation of each component carrier in accordance with the switching control information.

12. The mobile station apparatus according to claim 11, wherein:
    the setting information includes identification information for identifying a PDCCH and a PDSCH corresponding to each component carrier, and assignment information which indicates whether or not the PDCCH and the PDSCH corresponding to the identification information are assigned to each component carrier; and
    the switching control information includes information for switching assignment and non-assignment by the assignment information.

13. The mobile station apparatus according to claim 9, wherein:
    the receiving section is configured to receive the control information including whether or not a PDCCH and the PDSCH are assigned to the mobile station apparatus for each component carrier and the size of the UE-specific search space; and
    the detection section is configured to execute the blind detection process of the UE-specific search space depending on the size of the UE-specific search space included in the control information.

14. The mobile station according to claim 13, further comprising a switching section configured to switch activation and deactivation of each component carrier, wherein:
the receiving section is configured to receive the control information including setting information that is necessary for a switch of activation and deactivation of each component carrier, by RRC signaling, and receive the PDCCH including switching control information which switches the activation and deactivation of each component carrier; and
the switching section is configured to switch the activation and deactivation of each component carrier in accordance with the switching control information.

15. The mobile station apparatus according to claim 9, wherein:
the receiving section is configured to receive the control information including a component carrier, to which a PDCCH and the PDSCH for the mobile station apparatus are assigned based on a DCI format size, and the size of the UE-specific search space and
the detection section is configured to execute the blind detection process of the UE-specific search space depending on the size of the UE-specific search space included in the control information.

16. The mobile station according to claim 15, further comprising a switching section configured to switch activation and deactivation of each component carrier, wherein:
the receiving section is configured to receive the control information including setting information that is necessary for a switch of activation and deactivation of each component carrier, by RRC signaling, and receive the PDCCH including switching control information which switches the activation and deactivation of each component carrier; and
the switching section is configured to switch the activation and deactivation of each component carrier in accordance with the switching control information.

17. A control information transmission method comprising the steps of:
at a base station apparatus:
adaptively controlling a size of a UE-specific search space depending on the number of component carriers to which a PDSCH for a mobile station apparatus is assigned; generating control information reflecting a controlled result; and
transmitting the control information to the mobile station apparatus by RRC signaling; and
at the mobile station apparatus:
receiving the control signal; and
executing a blind detection process of the UE-specific search space designated by the control information.

18. The control information transmission method according to claim 17, further comprising the steps of:
at the base station apparatus:
generating the control information including setting information that is necessary for a switch of activation and deactivation of each component carrier;
transmitting the control information including the setting information to the mobile station apparatus by RRC signaling;
generating switching control information which switches activation and deactivation of each component carrier; and
including the switching control information in the PDCCH to transmit to the mobile station apparatus; and
at the mobile station apparatus:
receiving the control information including the setting information by RRC signaling;
receiving the PDCCH including the switching control information; and
switching activation and deactivation of each component carrier in accordance with the switching control information.

* * * * *